United States Patent
Al Harthi

(10) Patent No.: US 12,216,087 B2
(45) Date of Patent: Feb. 4, 2025

(54) PORTABLE EMI MACHINE

(71) Applicant: SAUDI ARABIAN OIL COMPANY, Dhahran (SA)

(72) Inventor: Amer Hamoud Al Harthi, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 208 days.

(21) Appl. No.: 18/065,244

(22) Filed: Dec. 13, 2022

(65) Prior Publication Data

US 2024/0192171 A1    Jun. 13, 2024

(51) Int. Cl.
| | |
|---|---|
| *E21B 41/00* | (2006.01) |
| *G01N 27/9013* | (2021.01) |
| *G01N 27/9093* | (2021.01) |

(52) U.S. Cl.
CPC ......... *G01N 27/9026* (2013.01); *E21B 41/00* (2013.01); *G01N 27/9093* (2013.01)

(58) Field of Classification Search
CPC ........... G01N 27/9026; G01N 27/9093; G01N 27/902; E21B 41/00
See application file for complete search history.

(56) References Cited

U.S. PATENT DOCUMENTS

| | | | |
|---|---|---|---|
| 11,402,351 B1* | 8/2022 | Tolman | G01N 27/9026 |
| 2002/0069704 A1 | 6/2002 | Robb | |
| 2019/0161919 A1* | 5/2019 | Gilbert | G01N 29/043 |
| 2022/0390641 A1* | 12/2022 | Dai | E21B 47/085 |
| 2024/0192151 A1* | 6/2024 | Zhang | G01N 23/04 |

OTHER PUBLICATIONS

Office Action issued by Saudi Arabian Patent Office for corresponding Saudi Arabian patent application No. SA 123451041, mailed Oct. 2, 2024 (8 pages).

* cited by examiner

*Primary Examiner* — Christopher E Mahoney
(74) *Attorney, Agent, or Firm* — Osha Bergman Watanabe & Burton LLP

(57) ABSTRACT

A truck mounted portable electromagnetic inspection (EMI) machine assembly is disclosed. The truck mounted portable EMI assembly includes a portable EMI machine having an input port coupled to a scanning tunnel and adapted to receive a tubular for passing through the scanning tunnel, the scanning tunnel comprising an excitation coil configured to induce an eddy current in a surface of the tubular passing through the scanning tunnel, and an output port coupled to the scanning tunnel and adapted to allow the tubular to exit from the scanning tunnel, and a mechanical turntable adapted to mount the portable EMI machine on a truck and adjust an orientation of the portable EMI machine with respect to the truck. The mechanical turntable includes an upper base and a lower base coupled together.

20 Claims, 5 Drawing Sheets

PORTABLE EMI MACHINE

BACKGROUND

Electromagnetic Inspection (EMI) is an effective method that uses the principal of magnetic induction for detecting defects in tubulars made of conductive materials. In oil and gas industry, the EMI machine is often used to perform non-destructive testing (NDT) for detecting structural defects, such as fatigue cracks, corrosion, pits, cuts, washouts, wall loss, etc. of drill pipes or other tubulars at the wellsite. In particular, portable EMI machines are utilized for onsite NDT of short and small pipes such as crossovers/pup joints from 2⅜" to 6⅝" in outside diameters (OD). However, due to the large OD (e.g., 7" to 13") and extended length, casings for drilled wells are transported away from the wellsite for NDT using stationary EMI machines fixed on the ground.

SUMMARY

In general, in one aspect, the invention relates to a truck mounted portable electromagnetic inspection (EMI) machine assembly. The truck mounted portable EMI assembly includes a portable EMI machine having an input port coupled to a scanning tunnel and adapted to receive a tubular for passing through the scanning tunnel, the scanning tunnel comprising an excitation coil configured to induce an eddy current in a surface of the tubular passing through the scanning tunnel, and an output port coupled to the scanning tunnel and adapted to allow the tubular to exit from the scanning tunnel, and a mechanical turntable adapted to mount the portable EMI machine on a truck and adjust an orientation of the portable EMI machine with respect to the truck. The mechanical turntable includes an upper base having a circular shaped protrusion extending from a bottom side of the upper base, and a lower base having a recess formed on a top side of the lower base to receive the protrusion when the upper base and lower base are coupled together to form the mechanical turntable.

In general, in one aspect, the invention relates to a truck equipped with a portable electromagnetic inspection (EMI) machine. The truck includes a flat bed adapted to mount the portable EMI machine, the portable EMI machine having an input port coupled to a scanning tunnel and adapted to receive a tubular for passing through the scanning tunnel, the scanning tunnel comprising an excitation coil configured to induce an eddy current in a surface of the tubular passing through the scanning tunnel, and an output port coupled to the scanning tunnel and adapted to allow the tubular to exit from the scanning tunnel, and a mechanical turntable adapted to mount the portable EMI machine on the flat bed and adjust an orientation of the portable EMI machine with respect to the truck. The mechanical turntable includes an upper base having a circular shaped protrusion extending from a bottom side of the upper base, and a lower base having a recess formed on a top side of the lower base to receive the protrusion when the upper base and lower base are coupled together to form the mechanical turntable.

In general, in one aspect, the invention relates to a method for performing an operation of a wellsite. The method includes dispatching, to the wellsite prior to performing the operation, a truck equipped with a portable electromagnetic inspection (EMI) machine that has a flat bed adapted to mount the portable EMI machine, the portable EMI machine having an input port coupled to a scanning tunnel and adapted to receive a tubular for passing through the scanning tunnel, the scanning tunnel comprising an excitation coil configured to induce an eddy current in a surface of the tubular passing through the scanning tunnel, and an output port coupled to the scanning tunnel and adapted to allow the tubular to exit from the scanning tunnel, and a mechanical turntable adapted to mount the portable EMI machine on the flat bed and adjust an orientation of the portable EMI machine with respect to the truck, performing EMI to detect a defect of the tubular, wherein the tubular with the defect is rejected from being use in the operation of the wellsite, and facilitating, by at least rejecting the tubular with the defect, the operation of the wellsite. The mechanical turntable includes an upper base having a circular shaped protrusion extending from a bottom side of the upper base, and a lower base having a recess formed on a top side of the lower base to receive the protrusion when the upper base and lower base are coupled together to form the mechanical turntable.

Other aspects and advantages will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Embodiments of this disclosure provide a portable electromagnetic inspection (EMI) machine that is mounted on a truck and dispatched to a wellsite rig area to inspect the tubular with OD capacity of up to 13". While mounted on the truck, the EMI machine can be rotated up to 90 degrees to receive the tubular and can be returned to the original position for safety during driving. The truck is equipped with a user console for a user to control the tubular movement and the EMI scanning steps. Moreover, the EMI machine receives electricity power from a generator mounted on the truck. The truck further includes other accessories such as racks and a motorized roller conveyor for staging and moving the tubulars, and a removable cover to protect the EMI machine from environment conditions such as the sand and rain.

Figure 1A:
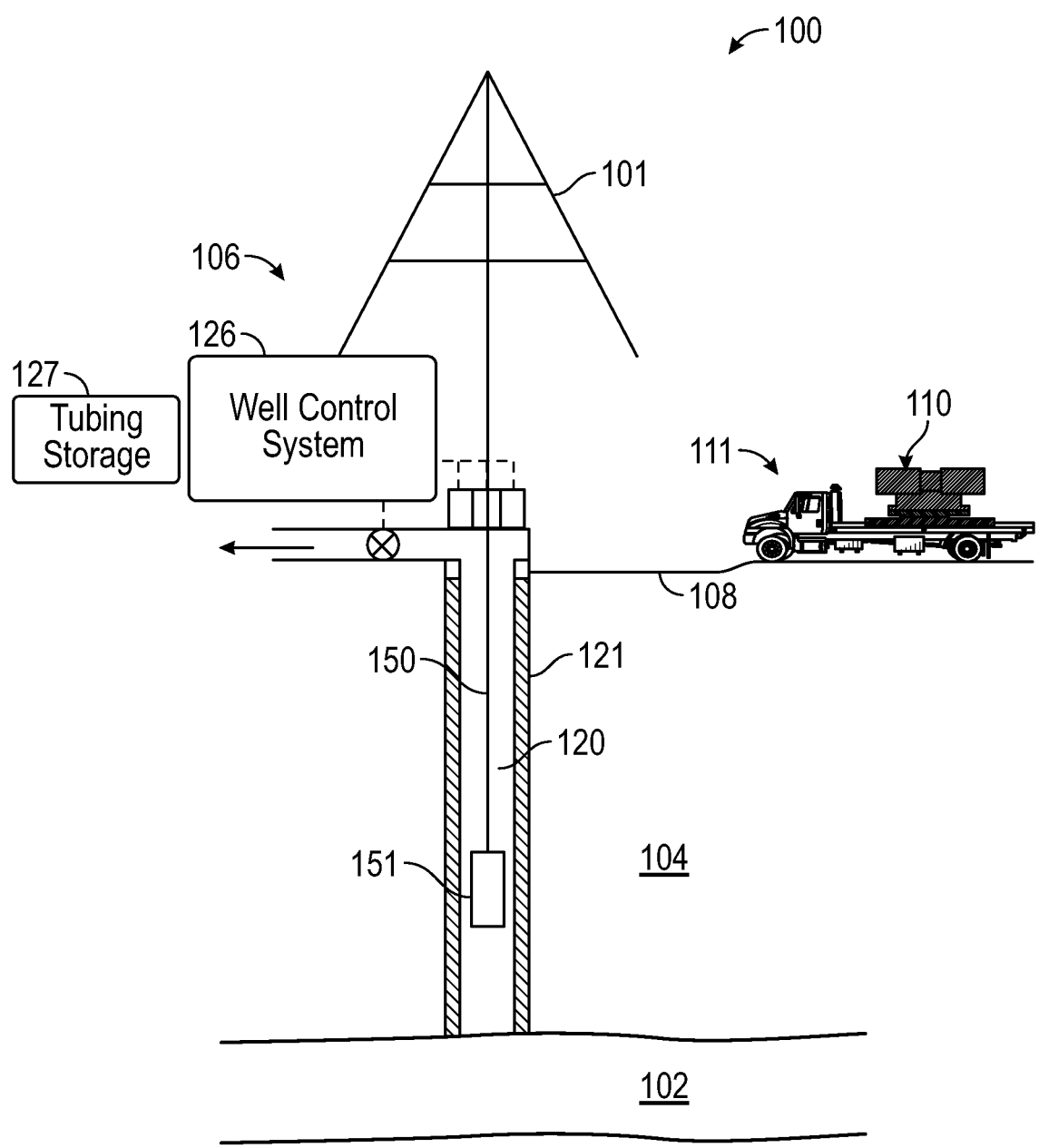
FIGS. 1A and 1B show systems in accordance with one or more embodiments.

FIG. 1A shows a schematic diagram in accordance with one or more embodiments. As shown in FIG. 1A, a well environment (100) includes a subterranean formation ("formation") (104) and a well system (106). The formation (104) may include a porous or fractured rock formation that resides underground, beneath the earth's surface ("surface") (108). The formation (104) may include different layers of rock having varying characteristics, such as varying degrees of permeability, porosity, capillary pressure, and resistivity. In the case of the well system (106) being a hydrocarbon well, the formation (104) may include a hydrocarbon-bearing reservoir (102). In the case of the well system (106) being operated as a production well, the well system (106) may facilitate the extraction of hydrocarbons (or "production") from the reservoir (102).

In some embodiments disclosed herein, the well system (106) includes a rig (101), a wellbore (120) with a casing (121), a well control system (126), and a tubing storage (127). The physical location of the well system (106) is referred to as the wellsite. The well control system (126) may control various operations of the well system (106), such as well production operations, well drilling operation, well completion operations, well maintenance operations, and reservoir monitoring, assessment and development operations. The operations of the well system (106) are performed using various tubulars, such as drill pipes, casing pipes, coupling pipes, etc. For example, a casing pipe is a long section (e.g., 40') of the casing string with a large diameter (e.g., 10"). At the wellsite, the tubing storage (127) is a physical facility (e.g., a rack, a warehouse, etc.) for storing a collection of tubulars that are readily available to be deployed to support various operations of the well system (106). Prior to deployment, the tubulars are inspected using a portable EMI machine (110) mounted on a truck (111) that is dispatched to the wellsite. The EMI machine (110) carried by the truck (111) may be dispatched to different wellsites according to a pre-determined schedule or as requested by a user such as an operator at the wellsite or in an offsite control center.

The rig (101) is the machine used to drill a borehole to form the wellbore (120). Major components of the rig (101) include the drilling fluid tanks, the drilling fluid pumps (e.g., rig mixing pumps), the derrick or mast, the draw works, the rotary table or top drive, the drill string, the power generation equipment and auxiliary equipment. Drilling fluid, also referred to as "drilling mud" or simply "mud," is used to facilitate drilling boreholes into the earth, such as drilling oil and natural gas wells. The main functions of drilling fluids include providing hydrostatic pressure to prevent formation fluids from entering into the borehole, keeping the drill bit cool and clean during drilling, carrying out drill cuttings, and suspending the drill cuttings while drilling is paused and when the drilling assembly is brought in and out of the borehole.

The wellbore (120) includes a bored hole (i.e., borehole) that extends from the surface (108) towards a target zone of the formation (104), such as the reservoir (102). An upper end of the wellbore (120), terminating at or near the surface (108), may be referred to as the "up-hole" end of the wellbore (120), and a lower end of the wellbore, terminating in the formation (104), may be referred to as the "downhole" end of the wellbore (120). The wellbore (120) may facilitate the circulation of drilling fluids during drilling operations for the wellbore (120) to extend towards the target zone of the formation (104) (e.g., the reservoir (102)), facilitate the flow of hydrocarbon production (e.g., oil and gas) from the reservoir (102) to the surface (108) during production operations, facilitate the injection of substances (e.g., water) into the hydrocarbon-bearing formation (104) or the reservoir (102) during injection operations, or facilitate the communication of monitoring devices (e.g., logging tools) lowered into the formation (104) or the reservoir (102) during monitoring operations (e.g., during in situ logging operations).

In some embodiments, the well system (106) is provided with a bottom hole assembly (BHA) (151) attached to the drill string (150) to suspend into the wellbore (120) for performing the well drilling operation. The bottom hole assembly (BHA) is the lowest part of a drill string and includes the drill bit, drill collar, stabilizer, mud motor, etc.

Figure 1B:
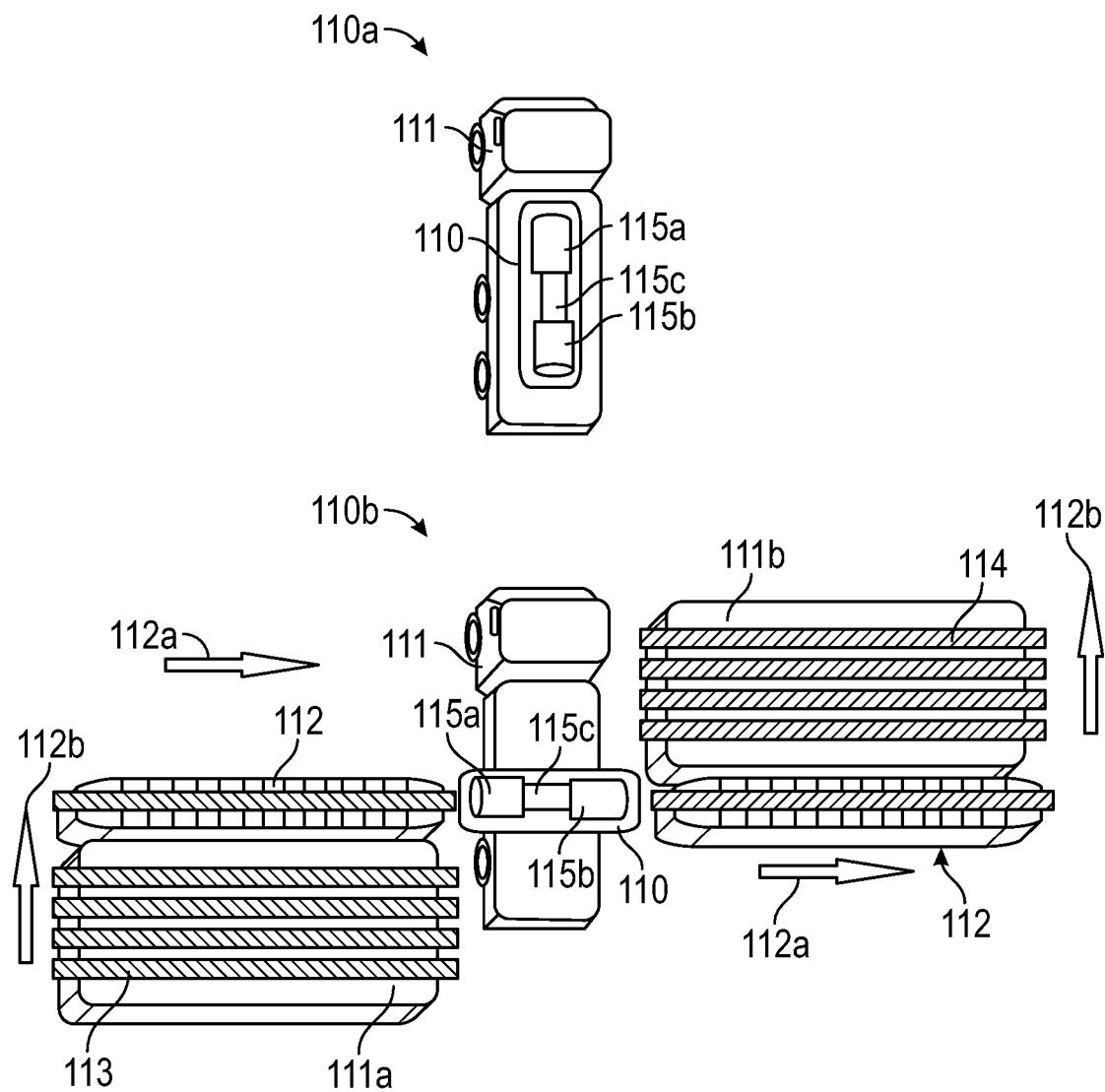

Turning to FIG. 1B, FIG. 1B illustrates a configuration A (110a) and a configuration B (110b) of the portable EMI machine (110) mounted on the truck (111) as depicted in FIG. 1A above. In one or more embodiments, one or more of the modules and/or elements shown in FIG. 1B may be omitted, repeated, combined and/or substituted. Accordingly, embodiments disclosed herein should not be considered limited to the specific arrangements of modules and/or elements shown in FIG. 1B.

As shown in FIG. 1B, the longitudinal axes of the portable EMI machine (110) and the truck (111) are parallel to each other in configuration A (110a). Configuration A (110a) is referred to as a driving configuration and is used while the truck (111) is moving so as to enhance safety during driving. In contrast, the longitudinal axes of the portable EMI machine (110) and the truck (111) are perpendicular to each other in configuration B (110b). Configuration B (110b) is referred to as an operating configuration and is used while the truck (111) is stationary for the portable EMI machine (110) to be used to inspect the tubulars. In configuration B (110b), a motorized roller conveyor (112) is positioned along the longitudinal direction of the portable EMI machine (110) while an input rack (111a) and an output rack (111b) are positioned on opposite sides of the longitudinal axis of the portable EMI machine (110). In one or more embodiments, the motorized roller conveyor (112), input rack (111a), and output rack (111b) are stowed in a storage compartment of the truck (111) when not used. During the inspection, uninspected casing and tubular (113) move along the direction (112b) to reach the motorized roller conveyor (112) configured to transport the uninspected casing and tubular to a scanning tunnel (115c) of the portable EMI machine (110). The uninspected casing and tubular enter the scanning tunnel (115c) via an input port (115a). The casing and tubular are inspected by electromagnetic (EM) scanning inside the scanning tunnel (115c). After the EM scanning, the casing and tubular exit the portable EMI machine (110) via an output port (115b) and are referred to as an inspected casing and tubular (114) that rolls off the motorized roller conveyor (112) onto the output rack (111b). The inspected casing the tubular (114) are then deployed for the operations of the well system (106). The truck (111) is equipped with a user console for a user to control the tubular movement and the EMI scanning steps. For example, the user console may include a touch-sensitive, a keyboard, or other user input devices to receive user control inputs. Moreover, the portable EMI machine (110) receives electricity power from a generator mounted on the truck (111).

Figure 2:
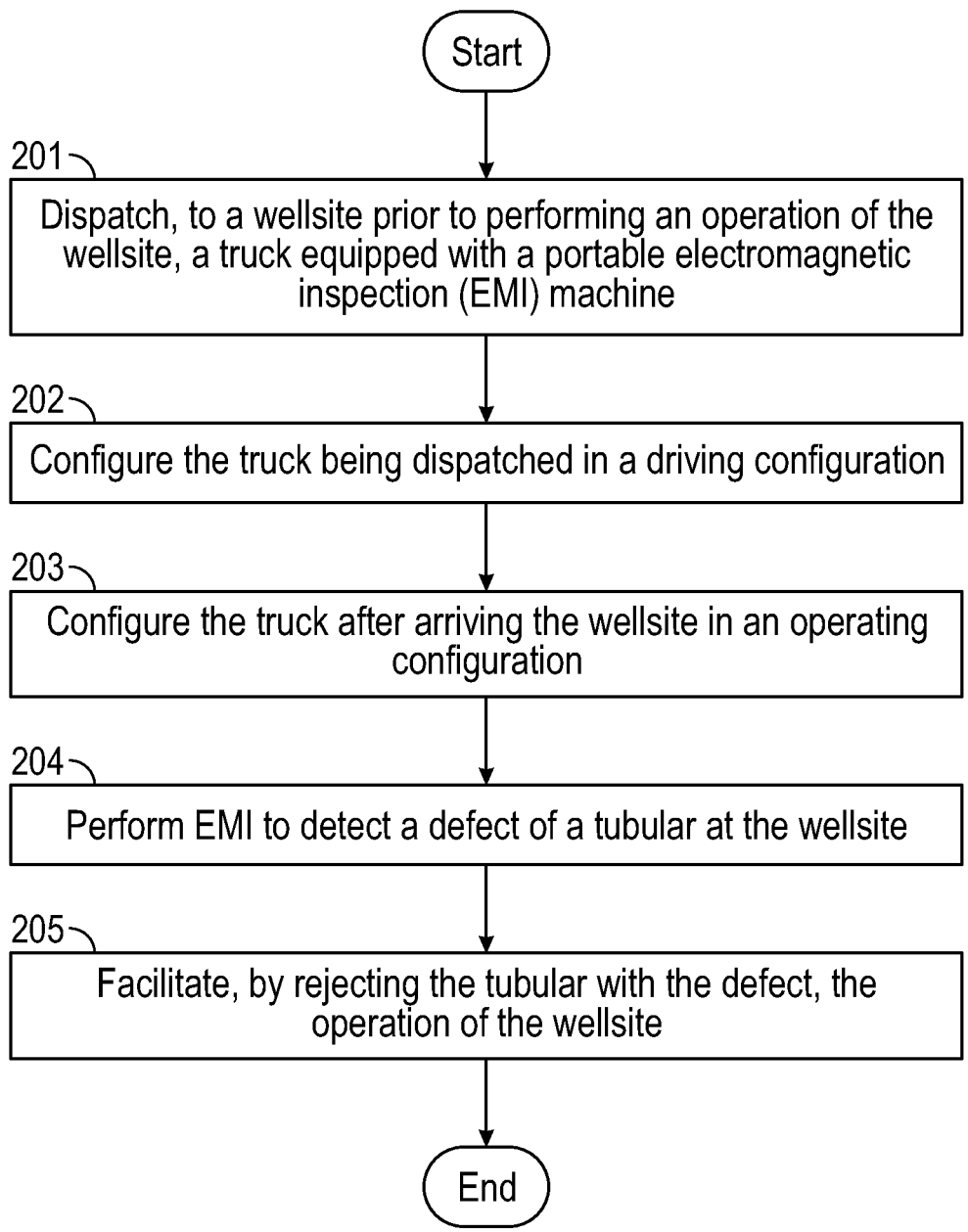
FIG. 2 shows a flowchart in accordance with one or more embodiments.

Turning to FIG. 2, FIG. 2 shows a process flowchart in accordance with one or more embodiments. Specifically, FIG. 2 describes a method to facilitate operations at a wellsite by performing onsite EMI for tubulars with large Ods. One or more blocks in FIG. 2 may be performed using one or more components as described in FIGS. 1A and 1B. While the various blocks in FIG. 2 are presented and described sequentially, one of ordinary skill in the art will appreciate that some or all of the blocks may be executed in a different order, may be combined or omitted, and some or all of the blocks may be executed in parallel and/or iteratively. Furthermore, the blocks may be performed actively or passively.

Initially in Block 201, a truck equipped with a portable electromagnetic inspection (EMI) machine is dispatched to a wellsite prior to performing an operation of the wellsite. In one or more embodiments, the portable EMI machine is mounted on a flat bed of the truck via a mechanical turntable. The portable EMI machine includes an input port to receive a tubular for passing through a scanning tunnel, which has an excitation coil configured to induce an eddy current in a surface of the tubular passing through the scanning tunnel, and an output port to allow the tubular to exit from the scanning tunnel.

In Block 202, the truck being dispatched is configured in a driving configuration where the portable EMI machine is locked by the mechanical turn table in an orientation parallel to a longitudinal axis of the truck. In one or more embodiments, the driving configuration also includes storing an input rack, an output rack, and a motorized roller conveyor in the truck that are to be used to support the EMI when arriving the wellsite.

In Block 203, the truck is configured after arriving the wellsite in an operating configuration where the portable EMI machine is locked by the mechanical turn table in an orientation perpendicular to the longitudinal axis of the truck. In one or more embodiments, the operating configuration also includes using the input rack to support and release the tubular onto a first section of the motorized roller conveyor, coupling the first section of the motorized roller conveyor to the input rack for transporting the tubular from the input rack to the input port of the portable EMI machine, and coupling a second portion of the motorized roller conveyor to the output rack for transporting the tubular from the output port of the portable EMI machine onto the output rack. In one or more embodiments, a user console of the truck is used to receive a control input from a user to control movements of the tubular and operations of the scanning tunnel.

In Block 204, the EMI is performed at the wellsite using the truck mounted portable EMI to detect a defect of the tubular. In one or more embodiments, the EMI is performed by using a sensor of the scanning tunnel to measure a change in an alternate current flowing in the excitation coil where the measured change is used to detect the defect in the tubular. In one or more embodiments, the EMI is performed by using a receiver coil of the scanning tunnel to measure a change in the eddy current induced in the surface of the tubular where the measured change is used to detect the defect in the tubular. In the scenario where the defect is detected on the tubular, the tubular with the defect is rejected from being use in the operation of the wellsite. In one or more embodiments, measurements from the scanning tunnel is displayed using the user console to facilitate the user to identify one or more defects of the tubular.

In Block 205, the operation of the wellsite is facilitated by at least rejecting the tubular with the defect. For example, a drilling operation or a production operation is performed without any disruption due to using a tubular without any defect that may cause a failure.

Figure 3A:
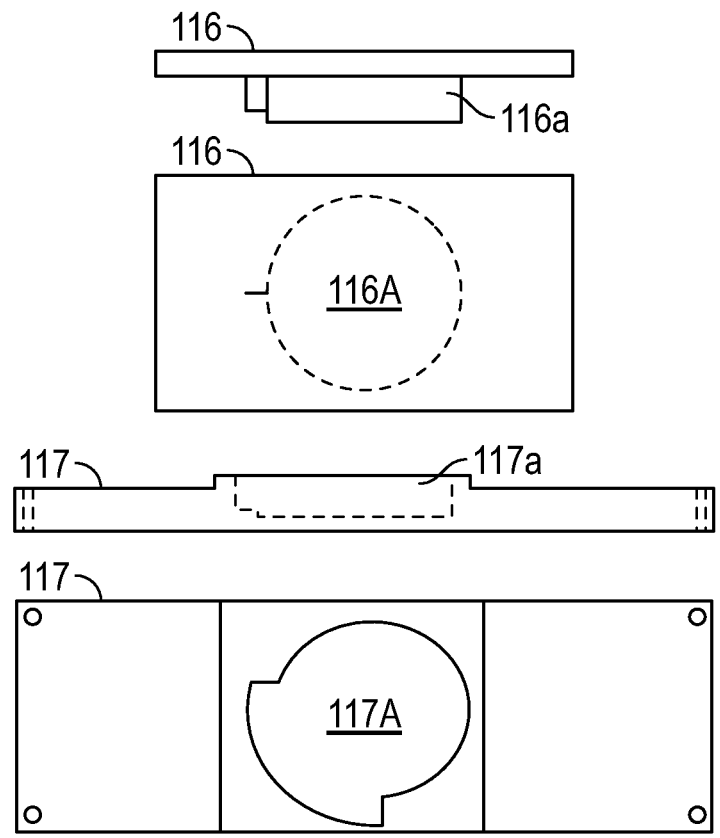
FIGS. 3A, 3B, and 3C show examples in accordance with one or more embodiments.
Figure 3B:
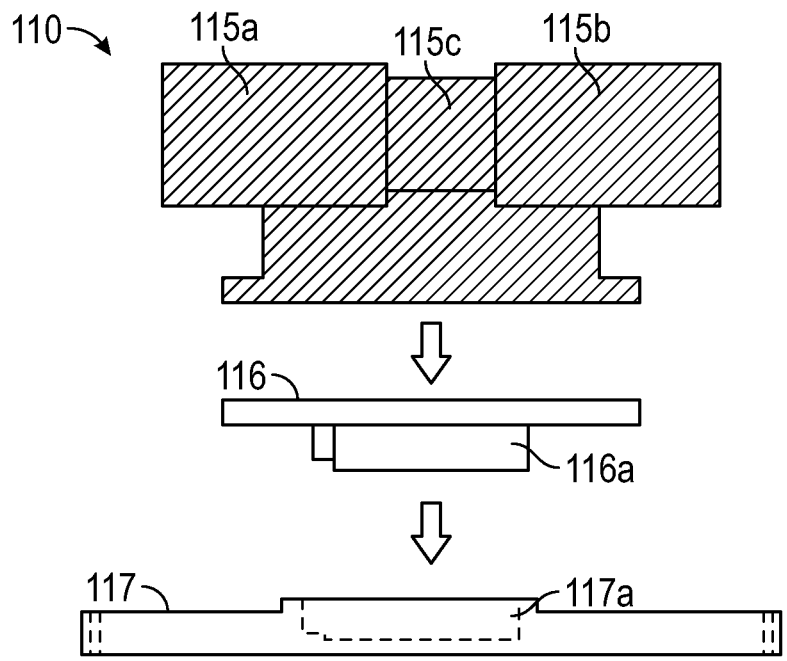
Figure 3C:
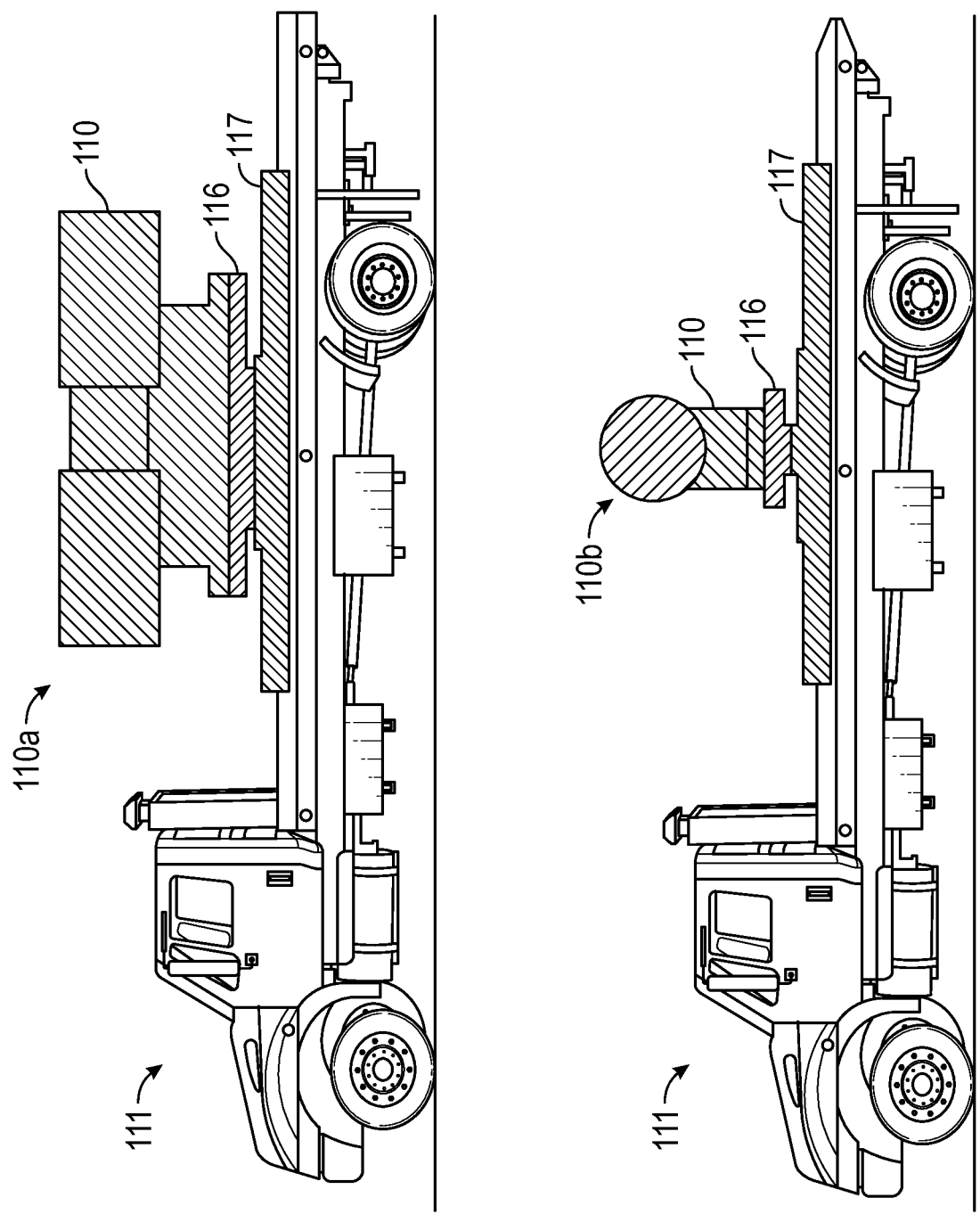

FIGS. 3A-3C show an example in accordance with one or more embodiments. The example shown in FIGS. 3A-3C is based on the system and method described in reference to FIGS. 1A-2 above. In particular, FIGS. 3A-3C shows an example truck mounted portable EMI machine depicted in FIGS. 1A-1B above. In one or more embodiments, one or more of the modules and/or elements shown in FIGS. 3A-3C may be omitted, repeated, combined and/or substituted. Accordingly, embodiments disclosed herein should not be considered limited to the specific arrangements of modules and/or elements shown in FIGS. 3A-3C.

FIG. 3A shows side views followed by respective top views of an upper base (116) and a lower base (117) that form a mechanical turn table for adjusting the orientation of the portable EMI machine (110) with respect to the truck (111). As shown in FIG. 3A, the upper base (116) includes a protrusion (116*a*) on the bottom and having a circular shape. Correspondingly, the lower base (117) includes a recess (117*a*) on the top and having a suitable shape to receive the protrusion (116*a*) when the upper base (116) and lower base (117) are coupled together to form the mechanical turn table.

FIG. 3B illustrates an example sequence of mounting the portable EMI machine (110) onto the truck (111). Initially, the lower base (117) is fixed on top of a flat bed (not shown) of the truck (111). The upper base (116) is then placed on top of the lower base (117) by inserting the protrusion (116*a*) into the recess (117*a*) to form the mechanical turn table. The portable EMI machine (110) is then fixed on top of the upper base (116).

Further, the portable EMI machine (110) includes the input port (115*a*), output port (115*b*), and scanning tunnel (115*c*). The input port (115*a*) and output port (115*b*) are openings to and from the scanning tunnel (115*c*) and include mechanical aligning mechanisms to facilitate tubular movements between the motorized roller conveyor (112) and the scanning tunnel (115*c*). Inside the scanning tunnel (115*c*), EM scanning is performed by placing an excitation coil that is energized with an alternating current (AC) in proximity to the test surface of the tubular-under-test. The energized excitation coil generates a changing magnetic field that interacts with the tubular-under-test to produce eddy currents in the test surface. Variations in the changing phases and magnitudes of the eddy currents are then monitored through the use of a receiver coil or by measuring changes to the alternate current flowing in the excitation coil. Variations in electrical conductivity or magnetic permeability as well as presence of mechanical discontinuities of the test surface cause a change in the eddy current and a corresponding change in phases and amplitude of the measured current in the receiver coil. The changes are shown on a user console mounted in the truck (111) and are interpreted by the user to identify defects in the tubular-under-test. For example, the user console may include a display screen to display the measured changes or related information derived from the measured changes.

FIG. 3C illustrates an example of the configuration A (110*a*) and configuration B (110*b*) depicted in FIG. 1B above. As shown in FIG. 3C, in both the configuration A (110*a*) and configuration B (110*b*), the portable EMI machine (110) is mounted on the flat bed of the truck (111) via the upper base (116) and the lower base (117). In the configuration A (110*a*), the portable EMI machine (110) and the truck (111) share the same longitudinal axis extending between front and rear tires of the truck (111). Accordingly, the side view of the portable EMI machine (110) is shown as viewed from the side of the truck (111). In contrast, in the configuration B (110b), the longitudinal axis of the portable EMI machine (110) is perpendicular to the longitudinal axis of the truck (111). Accordingly, the front view of the portable EMI machine (110) is shown as viewed from the side of the truck (111). In particular, the hollow tunnel (115c) is visible in the front view of the portable EMI machine (110) with any protective covering removed from the portable EMI machine (110).

In contrast to the portable EMI machine described above, an EMI machine fixed on the ground in an off-site service facility of an EMI service company would require sending the tubulars away from the wellsite for inspection. Offsite EMI inspection of this manner has the disadvantages of (i) expenses to transport the tubulars from the wellsite to the off-site service facility and back to the wellsite, (ii) incidents of damaged tubulars due to the transportation and loading/unloading processes in the off-site service facility, and (iii) daily charges and costs of the wellsite accrued while waiting for the inspected tubulars to return from the off-site service facility.

The portable EMI machine described above has the unique design where a mechanical turn table allows the EMI machine to be portable and rotatable up to 90 degree on a flat bed truck to receive the tubulars for inspection. Such embodiments of the portable EMI machine has the following advantages of (i) eliminating the tubular transportation cost, wellsite idling cost, and incidents of damaged tubulars, and (ii) reducing cost of EMI as one portable EMI machine will serve many different rigs or wellsites within one or more days.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, any means-plus-function clauses are intended to cover the structures described herein as performing the recited function(s) and equivalents of those structures. Similarly, any step-plus-function clauses in the claims are intended to cover the acts described here as performing the recited function(s) and equivalents of those acts. It is the express intention of the applicant not to invoke 35 U.S.C. § 112(f) for any limitations of any of the claims herein, except for those in which the claim expressly uses the words "means for" or "step for" together with an associated function.

What is claimed is:

1. A truck mounted portable electromagnetic inspection (EMI) machine assembly, comprising:
    a portable EMI machine comprising:
        an input port coupled to a scanning tunnel and adapted to receive a tubular for passing through the scanning tunnel;
        the scanning tunnel comprising an excitation coil configured to induce an eddy current in a surface of the tubular passing through the scanning tunnel; and
        an output port coupled to the scanning tunnel and adapted to allow the tubular to exit from the scanning tunnel; and
    a mechanical turntable comprising:
        an upper base having a circular shaped protrusion extending from a bottom side of the upper base; and
        a lower base having a recess formed on a top side of the lower base to receive the protrusion when the upper base and lower base are coupled together to form the mechanical turn table,
    wherein the mechanical turntable is adapted to:
        mount the portable EMI machine on a truck; and
        adjust an orientation of the portable EMI machine with respect to the truck.

2. The truck mounted portable EMI machine assembly of claim 1, the portable EMI machine further comprising:
    a sensor configured to measure a change in an alternate current flowing in the excitation coil,
    wherein the measured change in the alternate current flowing in the excitation coil is used to detect a defect in the tubular.

3. The truck mounted portable EMI machine assembly of claim 1, the portable EMI machine further comprising:
    a receiver coil configured to measure a change in the eddy current induced in the surface of the tubular,
    wherein the measured change in the eddy current induced in the surface of the tubular is used to detect a defect in the tubular.

4. The truck mounted portable EMI machine assembly of claim 1, wherein in a driving configuration,
    the truck is adapted to store an input rack, an output rack, and a motorized roller conveyor, and
    the portable EMI machine is locked by the mechanical turn table in a first orientation parallel to a longitudinal axis of the truck.

5. The truck mounted portable EMI machine assembly of claim 4, wherein in an operating configuration,
    the portable EMI machine is locked by the mechanical turn table in a second orientation perpendicular to the longitudinal axis of the truck,
    the input rack is adapted to support and release the tubular onto a first section of the motorized roller conveyor,
    the first section of the motorized roller conveyor is coupled to the input rack for transporting the tubular from the input rack to the input port of the portable EMI machine,
    a second portion of the motorized roller conveyor is coupled to the output rack for transporting the tubular from the output port of the portable EMI machine onto the output rack.

6. The truck mounted portable EMI machine assembly of claim 5, wherein the truck comprises a user console configured to:
    receive, from a user, a control input to control movements of the tubular and operations of the scanning tunnel; and
    display measurements from the scanning tunnel to facilitate the user to identify defects of the tubular.

7. The truck mounted portable EMI machine assembly of claim 1, wherein the truck further comprises a generator configured to supply electrical power to the portable EMI machine.

8. A truck equipped with a portable electromagnetic inspection (EMI) machine, comprising:
    a flat bed adapted to mount the portable EMI machine;
    the portable EMI machine comprising:
        an input port coupled to a scanning tunnel and adapted to receive a tubular for passing through the scanning tunnel;
        the scanning tunnel comprising an excitation coil configured to induce an eddy current in a surface of the tubular passing through the scanning tunnel; and an output port coupled to the scanning tunnel and adapted to allow the tubular to exit from the scanning tunnel; and a mechanical turntable comprising:
an upper base having a circular shaped protrusion extending from a bottom side of the upper base; and
a lower base having a recess formed on a top side of the lower base to receive the protrusion when the upper base and lower base are coupled together to form the mechanical turn table, wherein the mechanical turntable is adapted to:
mount the portable EMI machine on the flat bed; and
adjust an orientation of the portable EMI machine with respect to the truck.

9. The truck of claim 8, the portable EMI machine further comprising:
a sensor configured to measure a change in an alternate current flowing in the excitation coil,
wherein the measured change in the alternate current flowing in the excitation coil is used to detect a defect in the tubular.

10. The truck of claim 8, the portable EMI machine further comprising:
a receiver coil configured to measure a change in the eddy current induced in the surface of the tubular,
wherein the measured change in the eddy current induced in the surface of the tubular is used to detect a defect in the tubular.

11. The truck of claim 8, wherein in a driving configuration,
the truck is adapted to store an input rack, an output rack, and a motorized roller conveyor, and
the portable EMI machine is locked by the mechanical turn table in a first orientation parallel to a longitudinal axis of the truck.

12. The truck of claim 11, wherein in an operating configuration,
the portable EMI machine is locked by the mechanical turn table in a second orientation perpendicular to the longitudinal axis of the truck,
the input rack is adapted to support and release the tubular onto a first section of the motorized roller conveyor,
the first section of the motorized roller conveyor is coupled to the input rack for transporting the tubular from the input rack to the input port of the portable EMI machine,
a second portion of the motorized roller conveyor is coupled to the output rack for transporting the tubular from the output port of the portable EMI machine onto the output rack.

13. The truck of claim 12, further comprising a user console configured to:
receive, from a user, a control input to control movements of the tubular and operations of the scanning tunnel; and
display measurements from the scanning tunnel to facilitate the user to identify defects of the tubular.

14. The truck of claim 8, further comprising a generator configured to supply electrical power to the portable EMI machine.

15. A method for performing an operation of a wellsite, comprising:
dispatching, to the wellsite prior to performing the operation, a truck equipped with a portable electromagnetic inspection (EMI) machine, comprising:
a flat bed adapted to mount the portable EMI machine;
the portable EMI machine comprising:
an input port coupled to a scanning tunnel and adapted to receive a tubular for passing through the scanning tunnel;
the scanning tunnel comprising an excitation coil configured to induce an eddy current in a surface of the tubular passing through the scanning tunnel; and
an output port coupled to the scanning tunnel and adapted to allow the tubular to exit from the scanning tunnel; and
a mechanical turntable adapted to:
mount the portable EMI machine on the flat bed; and
adjust an orientation of the portable EMI machine with respect to the truck;
performing EMI to detect a defect of the tubular, wherein the tubular with the defect is rejected from being use in the operation of the wellsite; and
facilitating, by at least rejecting the tubular with the defect, the operation of the wellsite.

16. The method of claim 15, wherein performing the EMI comprises:
measuring, using a sensor of the scanning tunnel, a change in an alternate current flowing in the excitation coil,
wherein the measured change in the alternate current flowing in the excitation coil is used to detect the defect in the tubular.

17. The method of claim 15, wherein performing the EMI comprises:
measuring, using a receiver coil of the scanning tunnel, a change in the eddy current induced in the surface of the tubular,
wherein the measured change in the eddy current induced in the surface of the tubular is used to detect the defect in the tubular.

18. The method of claim 15, further comprising configuring the truck being dispatched in a driving configuration by:
storing an input rack, an output rack, and a motorized roller conveyor in the truck, and
locking the portable EMI machine by the mechanical turn table in a first orientation parallel to a longitudinal axis of the truck.

19. The method of claim 18, further comprising configuring the truck after arriving the wellsite in an operating configuration by:
locking the portable EMI machine by the mechanical turn table in a second orientation perpendicular to the longitudinal axis of the truck,
supporting and releasing, using the input rack, the tubular onto a first section of the motorized roller conveyor,
coupling the first section of the motorized roller conveyor to the input rack for transporting the tubular from the input rack to the input port of the portable EMI machine,
coupling a second portion of the motorized roller conveyor to the output rack for transporting the tubular from the output port of the portable EMI machine onto the output rack.

20. The method of claim 19, further comprising:
receive, from a user using a user console of the truck, a control input to control movements of the tubular and operations of the scanning tunnel; and
display, using the user console, measurements from the scanning tunnel to facilitate the user to identify defects of the tubular.

* * * * *